(12) United States Patent
Sekine (10) Patent No.: US 7,517,284 B2
(45) Date of Patent: Apr. 14, 2009

(54) JOINT SECTION BETWEEN A SHAFT AND A UNIVERSAL-JOINT YOKE

(75) Inventor: Hiroshi Sekine, Gunma (JP)

(73) Assignee: NSK Ltd., Tokyo (JP)

( * ) Notice: Subject to any disclaimer, the term of this patent is extended or adjusted under 35 U.S.C. 154(b) by 349 days.

(21) Appl. No.: 11/212,868

(22) Filed: Aug. 29, 2005

(65) Prior Publication Data
US 2006/0073902 A1   Apr. 6, 2006

(30) Foreign Application Priority Data
Aug. 30, 2004   (JP) .............. 2004-249580
Oct. 25, 2004   (JP) .............. 2004-309852

(51) Int. Cl.
*F16D 3/00*   (2006.01)
(52) U.S. Cl. ...................... 464/134; 464/182
(58) Field of Classification Search ........... 403/235, 403/290; 464/134, 182, 135
See application file for complete search history.

(56) References Cited

U.S. PATENT DOCUMENTS

| | | | |
|---|---|---|---|
| 3,867,050 A * | 2/1975 | Pitner | 403/373 |
| 4,900,178 A | 2/1990 | Haldric et al. | |
| 4,927,174 A * | 5/1990 | Jones | 280/777 |
| 5,090,833 A | 2/1992 | Oertle et al. | |
| 5,253,949 A | 10/1993 | Oxley et al. | |
| 5,358,350 A | 10/1994 | Oertle | |
| 7,179,009 B2 * | 2/2007 | Stimpfl et al. | 403/57 |
| 2001/0012470 A1 | 8/2001 | Keda | |
| 2005/0282641 A1 * | 12/2005 | Sadakata et al. | 464/134 |

FOREIGN PATENT DOCUMENTS

| | | |
|---|---|---|
| DE | 19829304 A1 | 2/1999 |
| EP | 0 309 344 | 3/1989 |
| EP | 0323298 A | 5/1989 |
| EP | 0445591 A | 9/1991 |
| GB | 2395248 A | 5/2004 |
| JP | 09291910 A | 11/1997 |
| JP | 2735260 | 1/1998 |
| JP | 3531364 | 3/2004 |

* cited by examiner

*Primary Examiner*—Aaron M Dunwoody
(74) *Attorney, Agent, or Firm*—Miles & Stockbridge (57) ABSTRACT

In a joint section between a shaft and a universal-joint yoke a tip surface on the tip end of the shaft and an inside surface of a connecting section of the yoke fit together in concave-convex engagement. The tip surface contacts the inside surface at two contact locations, and a clearance between these surfaces is formed between the two contact locations, whereby movement of the tip end of the shaft is restricted and vibration of the shaft is prevented.

9 Claims, 10 Drawing Sheets

JOINT SECTION BETWEEN A SHAFT AND A UNIVERSAL-JOINT YOKE

BACKGROUND OF THE INVENTION

1. Field of the Invention

This invention relates to a joint section between a shaft and universal-joint yoke, and more particularly to a joint in a steering apparatus, for example, that is used for joining the ends of the various shafts of the steering apparatus to a universal-joint yoke.

2. Description of the Related Art

Figure 12:
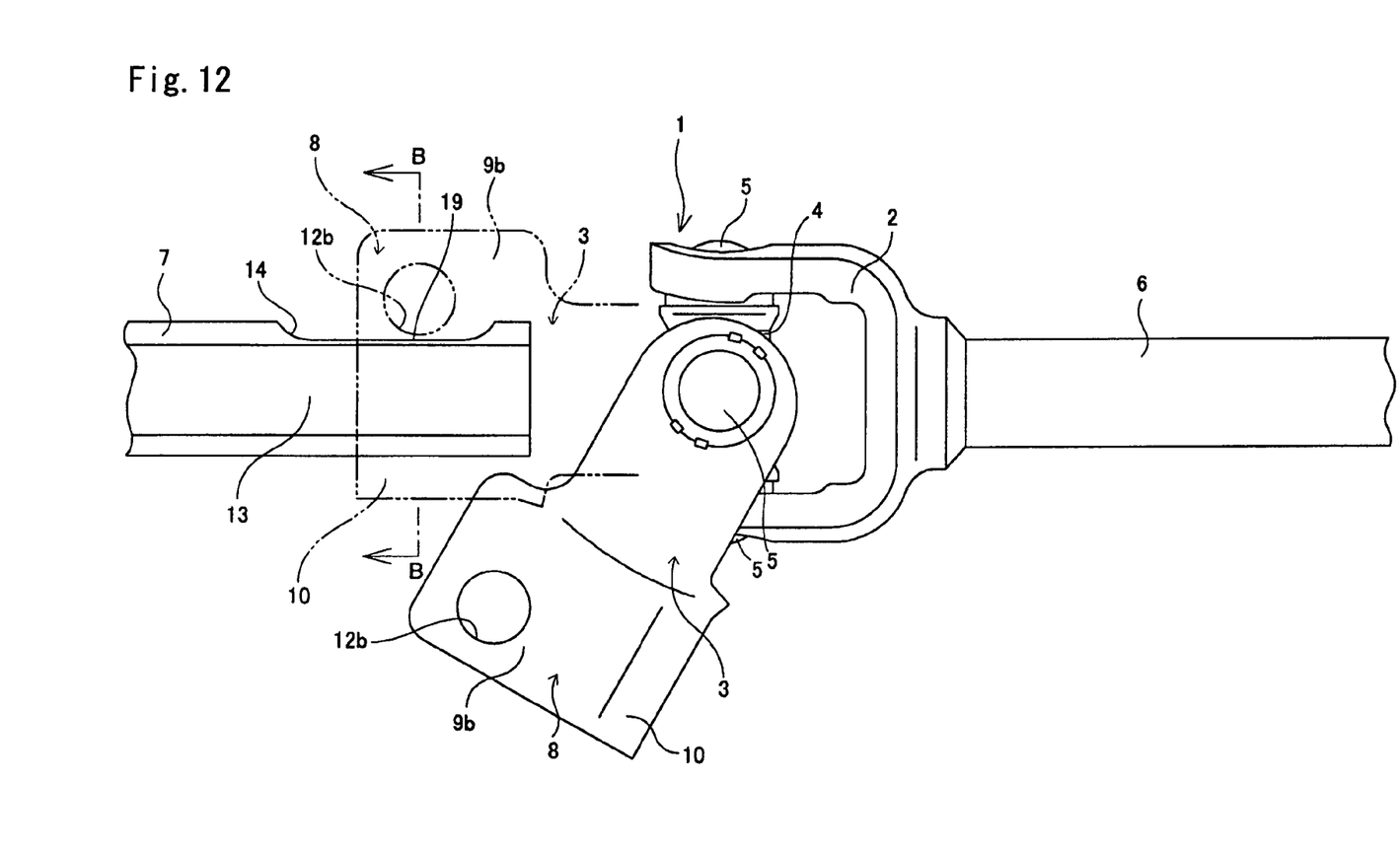
FIG. 12 is a side view of the construction to which the present invention is applied, and shows the state when the end of the shaft is joined with the base end section of the yoke.

In a steering apparatus for steering the front wheels of an automobile, the movement of the steering shaft that turns as the steering wheel is operated is transmitted to the input shaft of a steering gear by way of cross-shaft type universal joint as shown in FIG. 12. This universal joint 1 joins a pair of yokes 2, 3 by way of a cross shaft 4. The four end sections of this cross shaft 4 are supported on the tip end sections of the yokes 2, 3 by way of bearings that use rollers located inside bearing cups 5 such that they can freely oscillate. Therefore, it is possible to transmit torque between the yokes 2, 3 even though the center axes of these yokes 2, 3 are not on the same straight line.

When this kind of universal joint 1 is installed in a steering apparatus, one of the yokes 2 (right yoke in FIG. 12) is joined and fastened in advance to the end section of one of the shafts 6, such as the steering shaft, by welding or screws, and the other yoke 3 (left yoke in FIG. 12) is joined to the end section of the other shaft 7. Normally, in order to perform this kind of assembly work, after the one shaft 6 is supported by the automobile chassis, this one shaft 6 and the other shaft 7 are joined by the aforementioned universal joint 1.

Also, of the pair of yokes 2, 3 of the universal joint 1, it is preferred that at least one of the yokes 3 is a so-called side-insertion-type yoke (slap yoke) so that connection work can be performed without having to move the one shaft 6 in the axial direction. For example, in the case of the universal joint 1 shown in FIG. 12, the other yoke 3 is a side-insertion-type yoke, while the yoke 2 is joined and fastened to the end section of one of the shaft 6 by welding.

Figure 13:
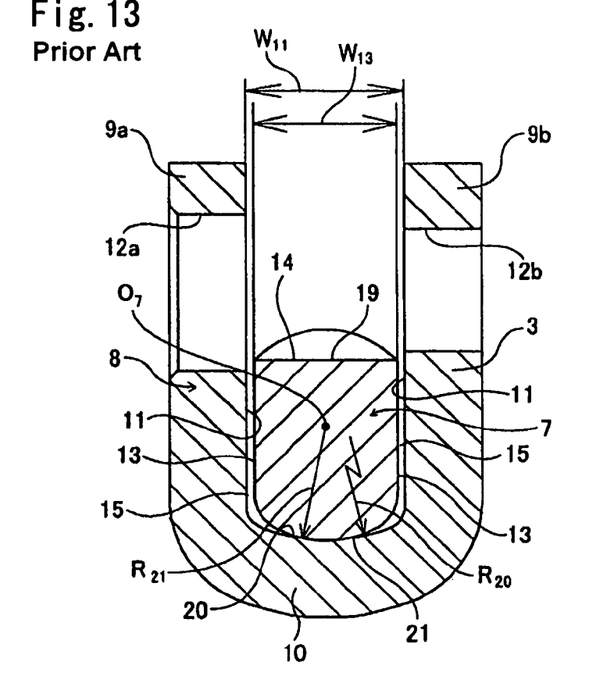
FIG. 13 is a cross-sectional view of the section B-B in FIG. 12 in a first example of conventional construction.
Figure 14:
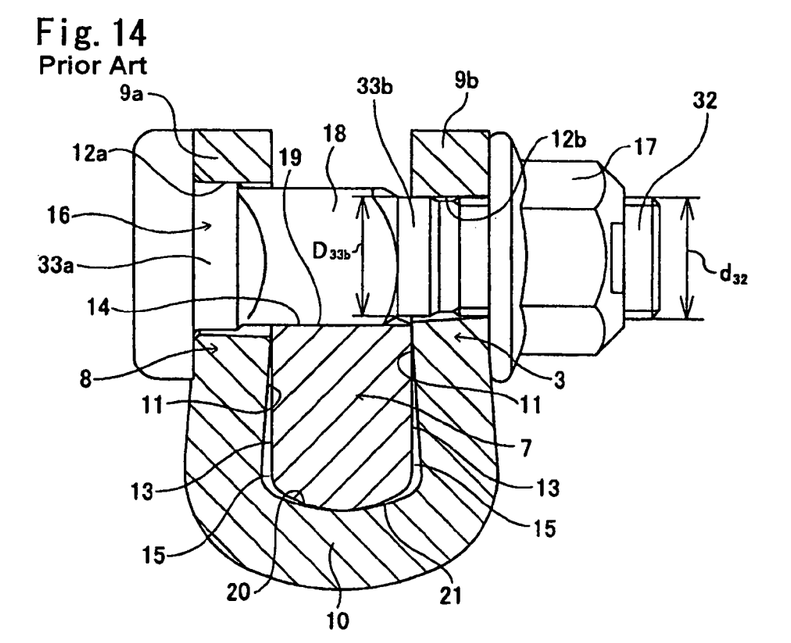
FIG. 14 is a drawing showing the state when the joint section is completed by screwing on and tightening the nut onto the tip end of the support bolt that has been inserted through the through holes in the first example of conventional construction.

FIG. 13 and FIG. 14 show examples of joints between this kind of side-insertion type yoke 3 and shaft 7, and it is well known prior art as is disclosed in Patent Documents 1 and 2 (JP Patent No. 3,531,364 and U.S. Pat. No. 4,900,178). The base-end section 8 of the yoke 3 has a U-shaped cross section and comprises a pair of support plates 9a, 9b that are separated from each other on both sides of the center axis of this yoke 3, and a connecting section 10 that connect one of the ends of each of these support plates 9a, 9b (bottom ends in FIGS. 13 and 14). The inner surfaces of this pair of support plates 9a, 9b become support surfaces 11 that are parallel to each other. Also, through holes 12a, 12b that are concentric with each other are formed in the sections near the other ends of these support plates 9a, 9b (top ends in FIGS. 13 and 14).

On the other hand, the cross-sectional shape of at least the tip end of the shaft 7 that is joined to the yoke 3 constructed as described above is an oval shape as shown in FIG. 13. In other words, on the outer surface on the tip end of this shaft 7 there is a pair of outside flat surfaces 13 that are parallel with each other and that are supported surfaces. Also, a notch 14 is formed in the part near the tip end on the surface of one side of the shaft 7 (top side surface in FIGS. 13 and 14) in a direction that runs parallel with both of these outside surfaces 13 (vertical direction in FIGS. 13 and 14).

When the tip end of the shaft 7 is joined to the base end 8 of the yoke 3, first, as shown by the solid line in FIG. 12, the tip end of the shaft 7 is placed on the opening side of the base end 8. From this state, by rotating the yoke 3 around the cross shaft 4 from the state shown by the solid line in the figure to the state shown by the dashed line, the tip end of the shaft 7 is inserted inside the base end 8 of the yoke as shown in FIG. 13. In order to make it easier to perform this kind of insertion work, when the yoke 3 and shaft 7 are in the free state, the space $W_{11}$ between the support surfaces 11 is greater than the space $W_{13}$ between the outside flat surfaces 13 ($W_{11} > W_{13}$). Therefore, when the tip end of the shaft 7 is inserted inside the base end section of the yoke 3 as was described above, a positive clearance 15 occurs between the support surfaces 11 and the outside flat surfaces 13.

After the tip end of the shaft 7 has been inserted inside the base end section 8 of the yoke 3 as described above, next, as shown in FIG. 14, a support bolt 16 is inserted through the through holes 12a, 12b, and of the male screw section 32 formed on the tip end of this support bolt 16, a nut 17 is screwed onto the portion that protrudes to the outside from the through hole 12b, and this nut 17 is tightened to a specified torque. By doing this, the space between the pair of support surfaces 11 is narrowed, and these support surfaces 11 come in contact with the outside flat surfaces 13. Together with this, by turning the support bolt 16 such that the outer surface of a cam section 18 formed in the middle of this support bolt 16 presses against the bottom surface 19 of the notch 14, the shaft 7 is pressed against the inside surface 20 of the connecting section 10. In other words, of the other surface of the shaft 7 that is parallel with the outside flat surfaces 13 (surface on the bottom side in FIGS. 13 and 14), the opposing surface 21 located on the tip end of the shaft 7 that faces the inside surface 20 of the connecting section 10 comes into strong contact with this inside surface 20. Furthermore, by fitting the support bolt 16 with the notch 14, even when the nut 17 may come loose, it prevents the shaft 7 from coming out in the axial direction from inside the base end section 8.

Of the rod section of the support bolt 16, cylindrical sections 33a, 33b are formed on the portions that are inserted through the through holes 12a, 12b and that are in the middle section and the base end section of the rod section. Also, the areas of contact between the outer surfaces around these cylindrical sections 33a, 33b and the inner surfaces of the through holes 12a, 12b are such that they support the reaction force when the outer surface around the cam section 18 is pressed against the bottom surface 19 of the notch 14. In the case of the example shown in the figures, in addition to the cylindrical section 33b, the male screw section 32 is also inserted through the through hole 12b. Therefore, in order that the outer surface around this cylindrical section 33b comes in contact with the inner surface of the through hole 12b, the outer diameter $D_{33b}$ of the cylindrical section 33b is nearly the same as or a little greater than the outer diameter $d_{32}$ of the male screw section 32 ($D_{33b} \geq d_{32}$).

In the case of the joint section between the shaft 7 and yoke 3 as described above, from the aspect of sufficiently maintaining the strength of this joint section, it is preferred that both the support surfaces 11 come in contact with the entire surface of the outside flat surfaces 13. However, when tightening the nut 17 to a specified torque as described above in order to complete this joint section, the amount that the space between the support surfaces 11 is narrowed becomes greater in the section near the support bolt 16 and nut 17 (top side section in FIG. 14), and becomes less in the section far from the bolt 16 and nut 17 (bottom side section in FIG. 14). Therefore, when the joint section is completed, in many cases, as shown in FIG. 14, the support surfaces 11 and outside flat surfaces 13 come in contact only in the portions near the support bolt 16 and nut 17, and clearances 15 remain in the portions far away.

As a result, there is a possibility that vibration will occur in the joint section while driving due to the clearances 15. In other words, in the case of the conventional joint section described above, both the inside surface 20 of the connecting section 10 and the opposing surface 21 of the shaft 7 are partial cylindrical surfaces (the contour lines (cross-sectional shapes) projected on virtual planes that are orthogonal to the axial direction are simple arcs). Also, the radius of curvature $R_{20}$ of the inside surface 20 is nearly equal to or a little greater than the radius of curvature $R_{21}$ of the opposing surface 21 ($R_{20} \geqq R_{21}$), Therefore, as shown in FIG. 13, in the state before the nut 17 is screwed onto the support bolt 16 and tightened, the shaft 7, whose opposing surface 21 is in contact with the inside surface 20, is able to rotate around its center axis $O_7$ (within the range of the clearances 15) without the center axis moving in the upward direction in the figure. Therefore, as shown in FIG. 14, even when the shaft 7 is prevented from moving in the upward direction of the same figure by tightening the nut 17, when a large transmission torque is applied to this shaft 7 and yoke 3, the shaft 7 rotates around its center axis $O_7$ (within the range of the clearances 15) due to elastic deformation of the components, and there is a possibility that vibration will occur inside the joint section. This kind of vibration gives the driver operating the steering wheel a noise or vibration, and a feeling of rigidity when operating the steering wheel becomes poor and is not desirable.

Figure 15:
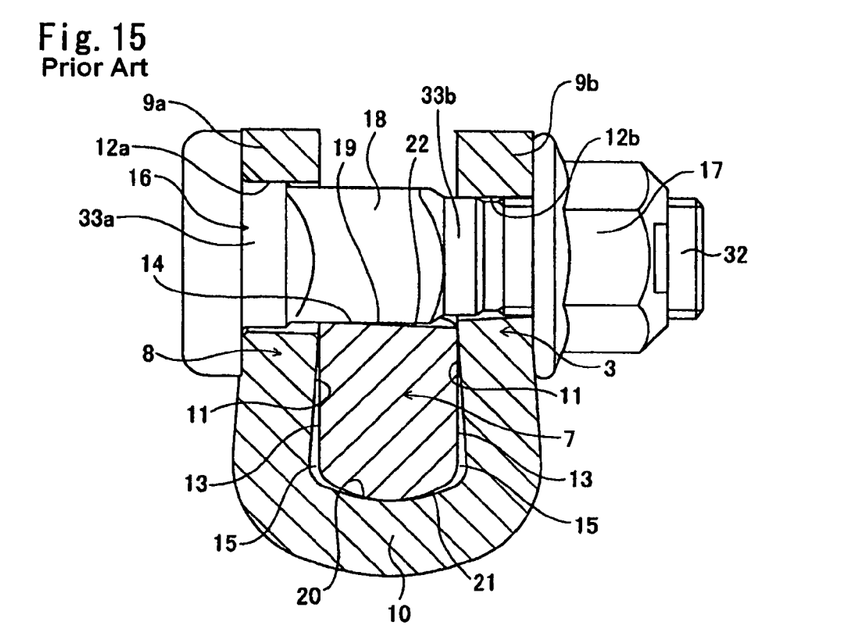
FIG. 15 is a drawing similar to FIG. 14, and it shows the state when the opposing surface of the notch in the shaft is inclined due to manufacturing error in the first example of conventional construction.

Also, in the case of the joint section described above, as shown in FIG. 15, due to errors in manufacturing, the bottom surface 19 of the notch 14 formed near the tip end section of the top surface of the shaft 7, may become an inclined surface with respect to a virtual plane that is orthogonal to the pair of outside flat surfaces 13. In this case, as shown in the same figure, only part of the outer surface around the cam section 18 of the support bolt 16 will come in contact with the bottom surface 19 (in the example shown in the figure, only the left end comes in contact), and a wedge-shaped clearance 22 occurs between the outer surface around the cam section 18 and the bottom surface 19. As a result, the effect of preventing rotation of the shaft 7 by the outer surface around the cam section 18 is reduced, and as described above, it becomes easy for the shaft 7 to rotate around its own center axis $O_7$ (refer to FIG. 13) (within the range of the clearances 15).

Figure 16:
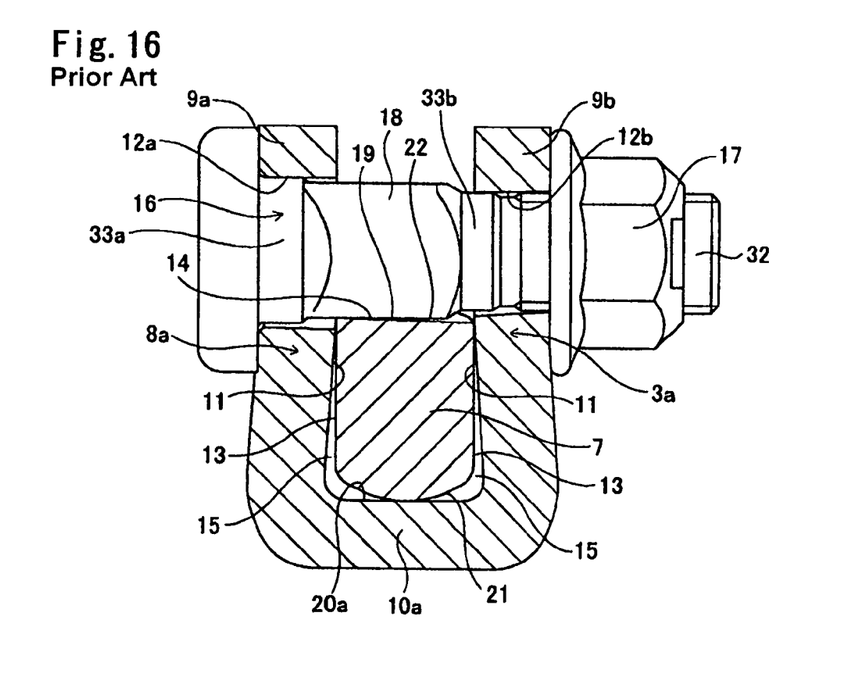
FIG. 16 is a drawing similar to FIG. 14, and it shows a second example of conventional construction.

Also, Patent Document 2 mentioned above and Patent Document 3 (U.S. Pat. No. 5,358,350), disclose construction such as shown in FIG. 16 in which the inside surface 20a of the connecting section 10a of the base end section 8a of the yoke 3a is a flat surface that is parallel with the center axis of the through holes 12a, 12b. In this second example of prior construction, in addition to the conditions of the first example of prior construction shown in FIG. 15, in the state before screwing the nut 17 onto the support bolt 16 and tightening it (not shown in the figure), the shaft 7, whose opposing surface 21 comes in contact with the inside surface 20a of the connecting section 10a, is able to move (within the range of the clearances 15) along this inside surface 20a in a displacement direction only in the axial direction of the through holes 12a, 12b (direction of the space between the pair of support plates 9a, 9b, or the left and right direction in FIG. 16). Therefore, in the case of this second example of prior construction, even when the shaft 7 is prevented from moving in the upward direction in the same figure by tightening the nut 17, it is possible for the shaft 7 to move in just the axial direction of the through holes 12a, 12b (within the range of the clearances 15) due to the elastic deformation of each of the parts. Therefore, the possibility of vibration occurring in the joint section is greater than in the case of the first example of prior construction described above, by the amount that this kind of possibility adds.

Figure 17:
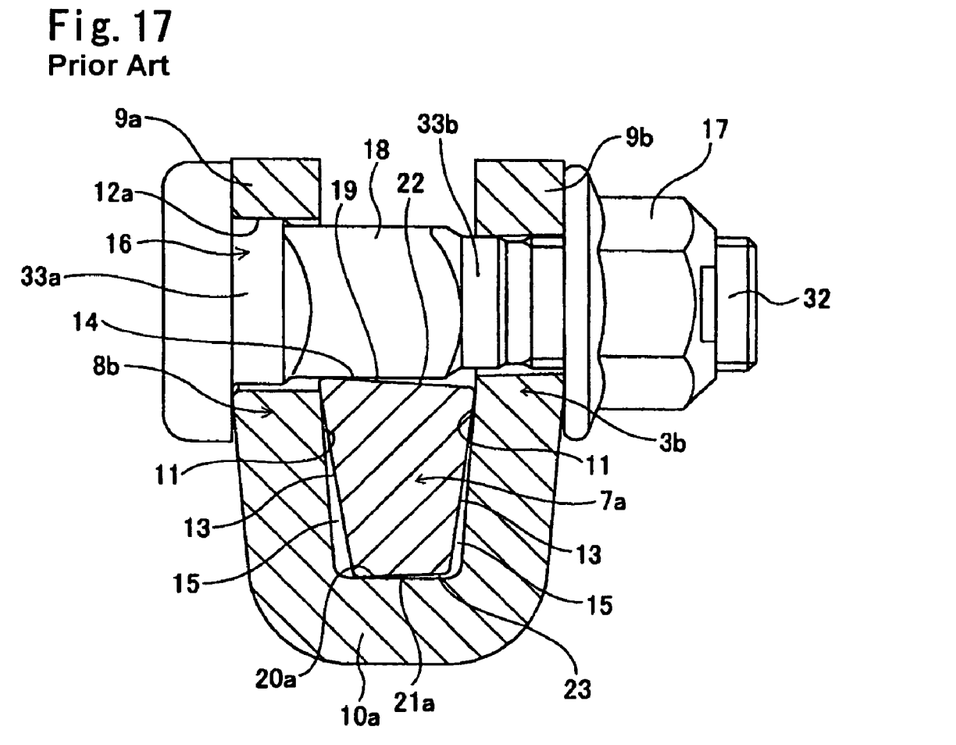
FIG. 17 is a drawing similar to FIG. 14, and it shows a third example of conventional construction.

Moreover, Patent Document 2 mentioned above discloses construction such as shown in FIG. 17 in which the cross-sectional shape of the shaft 7a and the cross-sectional shape of the inner surface of the base end section 8b of the yoke 3b are both trapezoidal. As in the case of the first and second examples described above, in the case of this third example of prior construction as well, when the joint section is completed, of the space between both support surfaces 11 and both outside flat surfaces 13, clearances 15, may still remain in the areas far from the support bolt 16 and nut 17 (bottom areas in the same figure). Also, a wedge-shaped space 22 may occur between the surface around the cam section 18 of the support bolt 16 and the bottom surface 19 of the notch 14, and due to this, part of the opposing surface (flat surface) 21a of the shaft 7a may come in contact with the inside surface (flat surface) 20a of the connecting section 10a (in the example shown in the figure, only the left end comes in contact), so a wedge-shaped space 23 may also occur between this opposing surface 21a and inside surface 20a. Therefore, in the case of this third example of prior construction as well, it becomes easy for the shaft 7 to move on the inside of the base end section 8b (within the range of the clearances 15) in proportion to the amount that these wedge-shaped clearances 22, 23 exist, so there is a possibility that vibration will occur in the joint section.

Patent Documents 4 and 5 (U.S. Pat. No. 5,090,833 and EU Patent Application No. 309,344) also disclosed other examples of prior art related to this invention.

[Patent Document 1] JP Patent No. 3531364
[Patent Document 2] U.S. Pat. No. 4,900,178
[Patent Document 3] U.S. Pat. No. 5,358,350
[Patent Document 4] U.S. Pat. No. 5,090,833
[Patent Document 5] EU Patent Application No. 309,344

SUMMARY OF THE INVENTION

Taking the conditions described above into consideration, the object of the joint section between a shaft and universal-joint yoke of this invention is to make it possible to prevent the occurrence of vibration in the joint section when the joint section is complete, even when clearance remain between both support surfaces and both supported surfaces.

The joint section between a shaft and universal-joint yoke of this invention comprises: a shaft that rotates during use; a pair of supported surfaces that are formed on both side surfaces on the tip end section of the shaft; a yoke constituting a universal joint that has a base end section that is open on one side; a pair of support-plate sections of the base-end section that are located in parallel with the center axis on both sides of the center axis of the yoke such that they are separated from each other and whose inside surfaces functioning as support surfaces, face the supported surfaces; a connecting section of the base-end section that connects these support-plate sections on the side opposite from the opening side; through holes or screw holes that are formed in the portion of the support-plate sections toward the opening end such that they are concentric with each other; and a support bolt that is inserted through or screwed through these through holes or screw holes and extends between the support-plate sections. Also, before the support bolt is screwed into the screw hole and tightened, or the support bolt is inserted through the through hole and a nut is screwed onto the tip end section of the support bolt and tightened, there is a positive clearance between the supported surfaces and support surfaces.

Particularly, in the joint section between a shaft and universal-joint yoke of this invention, before the support bolt is screwed into the screw hole and tightened, or the support bolt is inserted through the through hole and the nut is screwed onto the tip end section of the support bolt and tightened, and in the condition that the opposing surfaces located between both the supported surfaces of the tip end outer surfaces of the shaft and facing the inside surface of the connecting section comes in contact with the inside surface of the connecting section, the opposing surface of this shaft is fitted with the inside surface of the connecting section so that it is not possible to move the tip end section of the shaft in just the near-and-far direction with respect to the support-plate sections, and so that it is not possible to rotate the shaft around the center axis of the shaft unless the center axis of the shaft moves in the direction orthogonal to the center axis.

[Effect of the Invention]

In the case of the joint section between a shaft and universal-joint yoke of this invention constructed as described above, when the support bolt that is inserted through the through hole and screw hole formed in both of the support-plate sections and screwed and tightened into the screw hole, or the support bolt that is inserted through the through holes formed in both of the support-plate sections and the nut screwed on the tip end of this support bolt is tightened, it is possible to prevent vibration from occurring in the joint section even when clearances remain between both support surfaces and both supported surfaces. In other words, in this invention, by tightening the support bolt or nut as described above, in the condition that the tip end section of the shaft is pressed against the inside surface of the connecting section, the tip end of the shaft is not able to move in just the near-and-far direction with respect to both of the support-plate sections, and it is unable to rotate around its own center axis. Therefore, it is possible to prevent vibration in the joint section even when there are clearances remaining between both support surfaces and both supported surfaces and even though there is a large torque load applied between the shaft and yoke.

DESCRIPTION OF THE PREFERRED EMBODIMENTS OF THE INVENTION

In the case of this embodiment of the invention, for example, the opposing surface on the tip end section of the shaft and the inside surface of the connecting section fit together in concave-convex engagement.

Therefore, for example, it is possible for the opposing surface to be a convex surface whose contour line (cross-sectional shape) projected on a virtual plane that is orthogonal to its own axial direction is not an arc whose center is the center axis of the shaft or a point separated further from the opposing surface than that center axis, and for the inside surface to be a concave surface whose contour line projected on a virtual plane that is orthogonal to its own axial direction is not an arc whose center is the center axis of the yoke or a point that is separated further from the inside surface more than that center axis.

Also, it is possible for the opposing surface to be a convex surface whose contour line projected on a virtual plane that is orthogonal to its own axial direction is not a simple arc, and for the inside surface to be a concave surface whose contour line projected on a virtual plane that is orthogonal to its own axial direction is not a simple arc.

Also, it is possible for the opposing surface to be a concave surface whose contour line projected on a virtual plane that is orthogonal its own axial direction, and exists on the outside in the radial direction of an virtual arc that has the center axis of the shaft as its center and passes both ends of that contour line, and for the inside surface to be a concave surface whose contour line projected on a virtual plane that is orthogonal to its own axial direction, and exists on the outside in the radial direction of a virtual arc that has the center axis of the yoke as its center and passes both ends of that contour line.

Also, it is possible for the opposing surface to be a concave surface and the inside surface to be a convex surface.

In any case, by using the construction described above, at least the main effect of the present invention can be obtained. In other words, when the construction described above is used, before the support bolt is tightened or the nut screwed onto the support bolt is tightened, and the opposing surface is such that it is in contact with the inside surface, when trying to move the shaft in the far-and-near direction with respect to the support-panel sections, or when trying to rotate the shaft around its own center axis without displacement in the direction orthogonal to the axial direction, the opposing surface and inside surface fit with each other preventing the shaft from moving or turning. Therefore, it is possible to obtain at least the main effect of the present invention.

Also, in the case of this invention, it is preferred that when the support bolt is tightened or the nut screwed onto the support bolt is tightened, that the opposing surface on the tip end of the shaft comes in contact with the inside surface of the connecting section, and that both supported surfaces come in contact with both support surfaces.

By using this kind of construction, it is possible to more effectively prevent the occurrence of vibration in the joint section.

In the case of this invention, it is preferred that the a cam bolt having a cam section in the middle in the axial direction for pressing the outer surface around the tip end of the shaft be used as the support bolt. Also, it is preferred that a nut having a cam section in one section in the axial direction for pressing the outer surface around the tip end of the shaft be used as the nut that screws onto the tip end section of the support bolt.

By using this kind of construction, as the nut is screwed onto the support bolt and further tightened, the tip end section of the shaft is pressed toward the connecting section of the base end section of the yoke. Also, the opposing surface comes in contact with the inside surface, making it possible to prevent the occurrence of vibration in the joint section.

Embodiment 1

Figure 1:
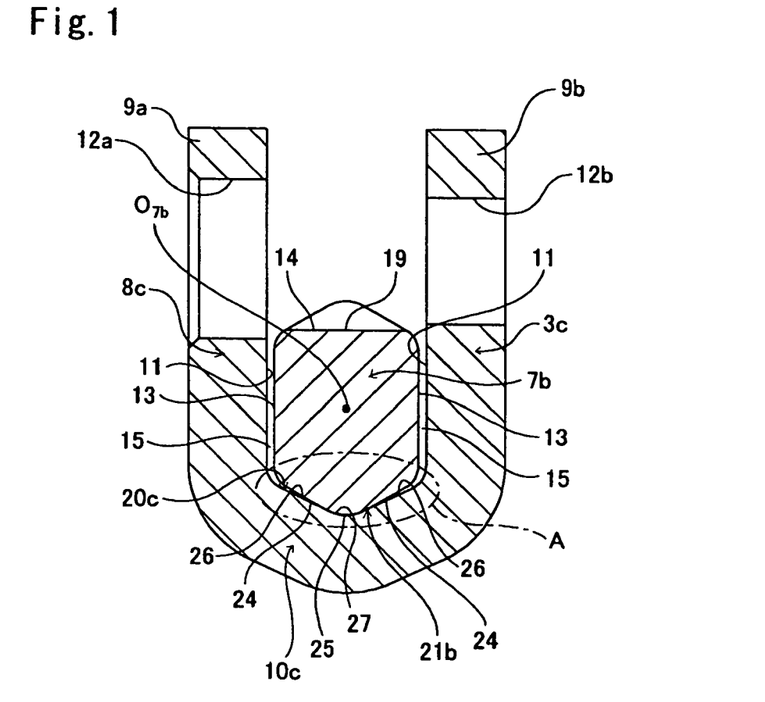
FIG. 1 is a drawing showing a first embodiment of the invention and corresponds to the cross section B-B in FIG. 12.
Figure 2:
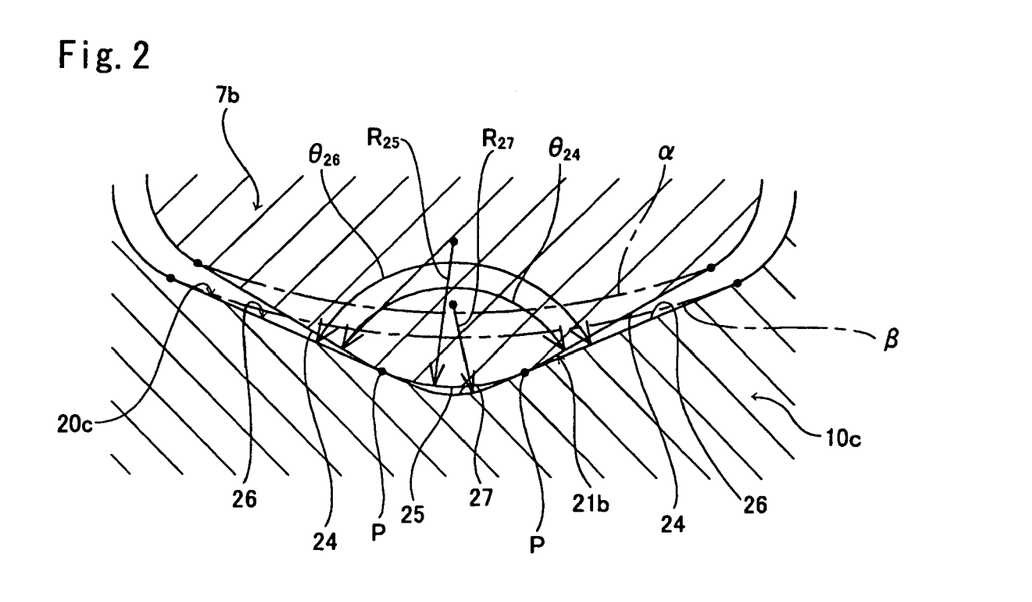
FIG. 2 is an enlarged view of section A in FIG. 1.
Figure 3:
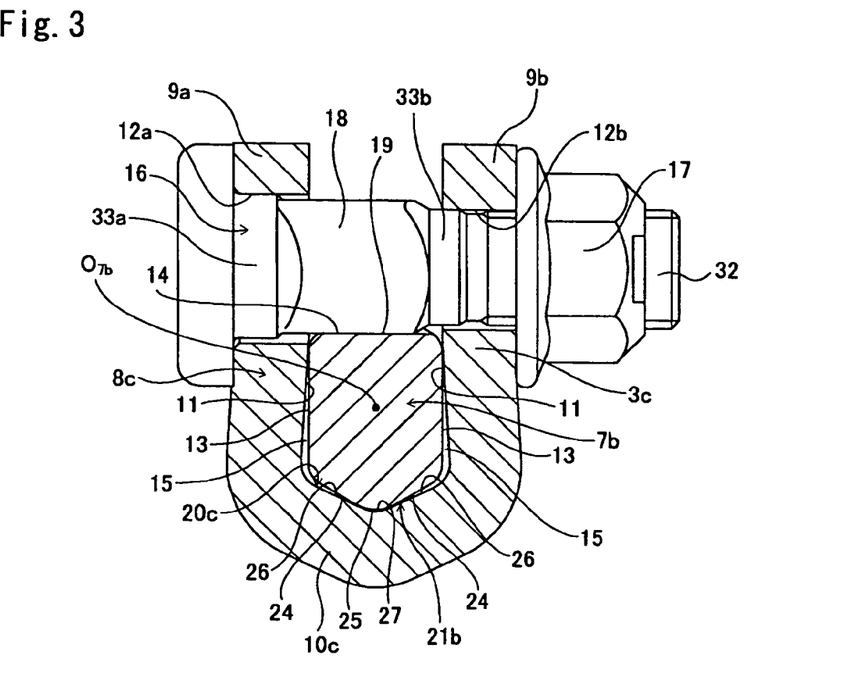
FIG. 3 is a drawing similar to FIG. 1, and it shows the state when the joint section is completed by screwing and tightening the nut onto the tip end of the support bolt that has been inserted through the through holes.

FIG. 1 to FIG. 3 show a first embodiment of the present invention. This embodiment is characterized by the design of the shapes of the opposing surface 21b of the shaft 7b and the inside surface 20c of the connecting section 10c of the base end section 8c of the yoke 3c that come in contact with each other. The construction and function of the other parts are the same as in the case of the conventional construction described above and shown in FIGS. 12 to 14, so duplicate drawings and explanations are omitted or simplified, and the explanation below centers on the features of this embodiment.

In the case of this embodiment, of the other side surface (bottom surface in FIGS. 1 to 3) of the shaft 7b, the opposing surface 21b that is located on the tip end section of the shaft 7b and that faces the inside surface 20c of the connecting section 10c has a V-shaped contour line (cross-sectional shape) projected onto a virtual plane that is orthogonal to the axial direction of the shaft 7b (front-to-back direction in FIGS. 1 to 3) and is a convex surface. In other words, the opposing surface 21b of the shaft 7b comprises a pair of flat surfaces 24 that are inclined in a direction going away from the center axis $O_{7b}$ of the shaft 7b (downward direction in FIGS. 1 to 3) as they approach the center in the width direction (left-right direction in FIGS. 1 to 3), and a convex curved surface 25 that smoothly connects the end edges of these flat surfaces 24. Particularly, in the case of this embodiment, when considering an arc α (see FIG. 2), whose center is the center axis $O_{7b}$ of the shaft 7b and that passes through the end sections on the opposite side of the flat surfaces 24, these flat sections 24 and the convex curved section 25 exist further on the opposite side (bottom side in FIGS. 1 to 3) of the center axis $O_{7b}$ than this arc α.

On the other hand, the inside surface 20c of the connecting section 10c has a V-shaped contour line (cross-sectional shape) projected onto a virtual plane that is orthogonal to the axial direction (front-to-back direction in FIGS. 1 to 3) of the yoke 3c, and is a concave. In other words, the inside surface 20c of this connection section 10c comprises: a pair of flat surfaces 26 that are inclined in the direction going away from the center line of the yoke 3c (downward direction in FIGS. 1 to 3) as they approach the center in the width direction (left-right direction in FIGS. 1 to 3); and a concave curved section 27 that smoothly connects the end edges of these flat surfaces 26. Particularly, in the case of this embodiment, when considering an arc β, whose center is the center axis of the yoke 3c (when assembled it coincides with the center axis of the shaft 7b) and that passes through the end sections on the opposite side of the flat surfaces 26, these flat sections 26 and the concave curved section 27 exist further on the opposite side (bottom side in FIGS. 1 to 3) of the center axis than this arc β. When press forming the yoke 3c, it is preferred that the connecting section of the end edges of the pair of flat surfaces 26 be formed as a concave curved section 27 as described above.

Also, in the case of this embodiment, the angle $\theta_{24}$ between the pair of flat surfaces 24 of the opposing surface 21b of the shaft 7b is just a little less than the angle $\theta_{26}$ between the pair of flat surfaces 26 of the inside surface 20c of the connecting section 10c ($\theta_{24} < \theta_{26}$). The radius of curvature $R_{25}$ of the convex curved section 25 of the opposing surface 21b of the shaft 7b is greater than the radius of curvature $R_{27}$ of the concave curved section 27 of the inside surface 20 of the connecting section 10c ($R_{25} > R_{27}$) (in this embodiment $R_{27} \geq 1.0$ mm). Also, as shown in FIGS. 1 to 3, by regulating the dimensions in this way, when the opposing surface 21b of the shaft 7b is in contact with the inside surface 20c of the connecting section 10c, the opposing surface 21b and inside surface 20 come in contact at only two locations (points P in FIG. 2) near the center in the width direction, and do not come in contact with each other in the center section in the width direction of the convex curved section 25 and concave curved section 27.

In the case of this embodiment, the contour lines of the opposing surface 21b of the shaft 7b and the inside surface 20c of the connecting section 10c are both V-shaped, so while the opposing surface 21b of the shaft is in contact with the inside surface 20c of the connecting section 10c as described above, it becomes easy to position the shaft 7b and base end section 8c of the yoke 3c in the width direction. As shown in FIG. 1, in the case of this embodiment, before screwing the nut 17 onto the support bolt 16 and tightening it (see FIG. 3), the size of the clearances 15 that exist between the support surfaces 11 and outside flat surfaces 13 (the thickness in the left-to-right direction in FIG. 1) is 0.25 mm or less (preferably 0.15 mm or less).

In the joint section of this embodiment constructed as described above, when in the state shown in FIG. 1, the shaft 7b is not able to move in just the far-and-near direction (left-right direction in FIGS. 1 to 3) with respect to the pair of support-plate sections 9a, 9b of the base end section 8c. In other words, in the case of this embodiment, even when trying to move the shaft 7b in just the far-and-near direction, it moves along the flat surfaces 26 of the connecting section 10c in not only the far-and-near direction, but also moves in the direction orthogonal to this far-and-near direction (upward in FIGS. 1 to 3). Also, in this same state, the shaft 7b is not able to rotate around the center axis $O_{7b}$ as long as the center axis $O_{7b}$ of the shaft 7b is not moved in the direction orthogonal to the far-and-near direction (upward in FIGS. 1 to 3). In other words, in the case of this embodiment, even when trying to rotate the shaft 7b around the center axis $O_{7b}$, the opposing surface 21b of the shaft 7b and inside surface 20c of the connecting section 10c fit with each other (at points P). Therefore, it is not possible for the shaft 7b to rotate around the center axis $O_{7b}$ unless the fit is removed by moving the center axis $O_{7b}$ in the direction orthogonal to the far-and-near direction (upward direction in FIGS. 1 to 3).

Also, in the case of this embodiment, as shown in FIG. 2, when the nut 17 is screwed onto the male screw section 32 of the support bolt 16 and further tightened to a specified torque, the support surfaces 11 and the outside flat surfaces 13 come in contact only in the area near the support bolt 16 and nut 17 (upper area in FIG. 2) and do not come in contact in the far area (bottom area in FIG. 2), and as a result, it is possible to prevent vibration in the joint section even when clearances 15 remain in the far area. In other words, in the case of this embodiment, when the nut 17 is tightened at a specified torque as described above, the tip end section of the shaft 7b is pressed against the inside surface 20c of the connecting section 10c by the outer surface around the cam section 18 formed in the middle section of the support bolt 16. As a result, the opposing surface 21b of the shaft 7b comes in strong contact with the inside surface 20c, and the shaft 7b is prevented from moving in the direction (upward in FIG. 2) away from this inside surface 20c. Therefore, in this state, the tip end section of the shaft 7b is not able to move in just the far-and-near direction with respect to both support-plate sections 9a, 9b, and is not able to rotate around the its own center axis $O_{7b}$. As a result, regardless of whether or not there is a very large torque, it is possible to prevent vibration from occurring in the joint section even when there are still clearances 15 between the support surfaces 11 and outside flat surfaces 13.

Figure 4:
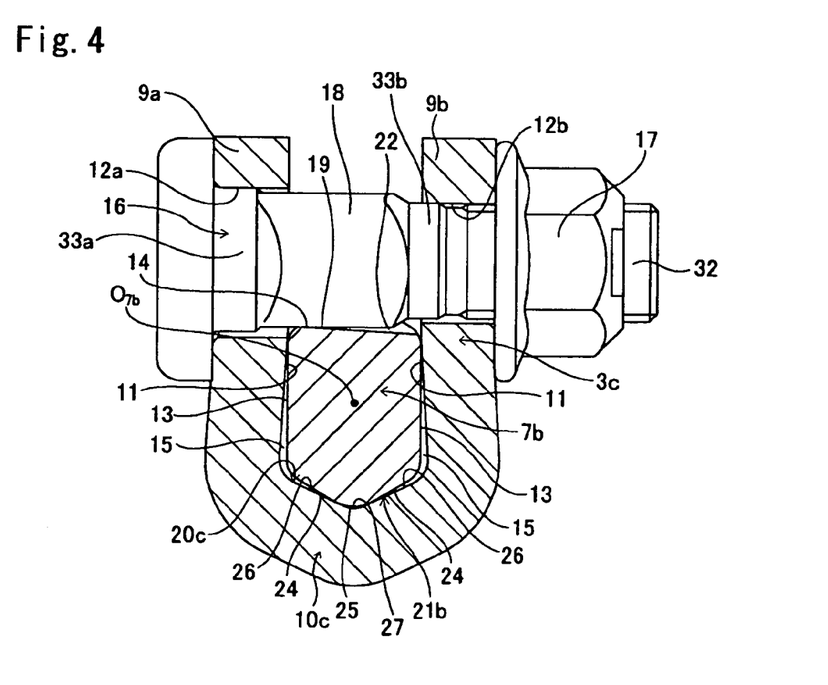
FIG. 4 is a drawing similar to FIG. 3, and it shows the state when the opposing surface of the notch in the shaft is inclined due to manufacturing error.

Also, in the case of this embodiment, similar to the case of conventional construction described above and as shown in FIG. 4, due to manufacturing error, the bottom surface 19 of the notch 14 formed in the section near the tip end on the top surface of the shaft 7b may become an inclined surface with respect to a virtual plane that is orthogonal to the pair of outside flat surfaces 13. In this case, as shown in the same figure, part of the outer surface around the cam section 18 of the support bolt 16 comes in contact with the bottom surface 19 (in the example shown in the figure, only the left end section comes in contact), and a wedge-shaped clearance 22 occurs between the outer surface around the cam section 18 and the bottom surface 19. However, in the case of this embodiment, even when this kind of clearance 22 occurs, due to the function described above, it is possible to prevent vibration from occurring in the joint section.

In the case of this embodiment, the smaller the angle $\theta_{26}$ made by the inside surface 20c of the connecting section 10c is, the larger the effect of being able to prevent vibration in the joint section is. The inventors performed tests using the universal joint of a steering apparatus, and found that an angle $\theta_{26}$ of 150 degrees or less ($\theta_{26} \leq 150$ degrees) was preferred; for example, when the angle $\theta_{26}$ was set 150 degrees, and when a largest torque of approximately 100 N·m was applied to the joint section, it was possible to prevent vibration from occurring in the joint section. The lower limit of the angle $\theta_{26}$ is regulated by the relationship with other conditions such as the rigidity or dimensions of the base end section 8c, and in the case of the shape of this embodiment, it is 120 degrees or greater.

Embodiment 2

Figure 5:
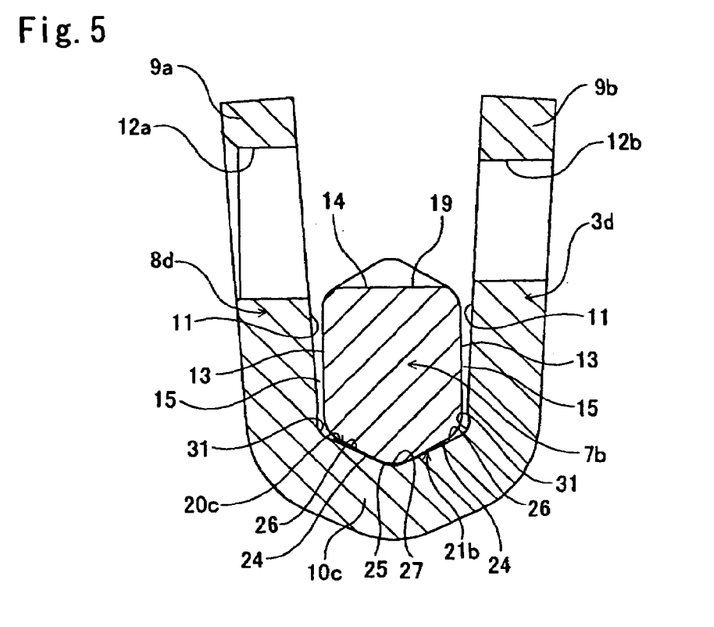
FIG. 5 is a drawing similar to FIG. 1, and it shows a second embodiment of the invention.

Next, FIG. 5 shows a second embodiment of the present invention. In this embodiment, when the base end section 8d of the yoke 3d is in a free state, the space between the pair of support-plate sections 9a, 9b of this base end section 8d is such that it becomes wider going toward the opening section of the base end section 8d (top end in FIG. 5). In the case of the joint section of this embodiment constructed as described above, it becomes easier to perform the work of inserting the tip end section of the shaft inside this base end section 8d from the opening section in proportion to the amount that the width of the opening section of the base end section 8d is made wider. Also, when the support bolt 16 is inserted through the through holes 12a, 12b formed in the support-plate sections 9a, 9b and the nut 17 (see FIG. 3) is screwed onto the male screw section 32 on this support bolt 16 and further tightened, the support surfaces 11, which are the inside surfaces of the support-plate sections 9a, 9b, come in contact with the outside flat surfaces 13, which are the side surfaces of the shaft 7b, successively from the side opposite the opening section of the base end section 8d (bottom side in FIG. 5) toward the opening side, making it more difficult for clearances 15 to remain between the support surfaces 11 and the outside flat surfaces 13. Therefore, in this embodiment, it is possible to obtain the effect of preventing vibration in the joint section for larger torque than in the case of the first embodiment described above. In the example shown in the figure, concave sections 31 having arc-shaped cross sections are formed in the continuous sections between the support surfaces 11 and the inside surface 20 of the connecting surface 10c. By doing this, the flexural rigidity of the support-plate sections 9a, 9b with respect to the connecting section 10c is lowered, making it possible to reduce the force necessary for bringing both of the support surfaces 11 closer together (force necessary for tightening the nut 17). However, in the case of this embodiment, the concave sections 31 are not absolutely necessary. The construction and function of the other parts are the same as in the case of the first embodiment described above.

Embodiment 3

Figure 6:
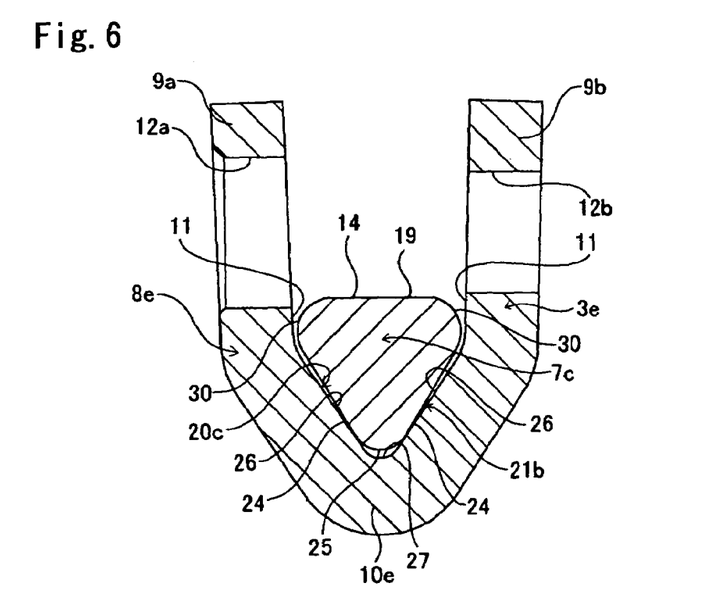
FIG. 6 is a drawing similar to FIG. 1, and it shows a third embodiment of the invention.
Figure 7:
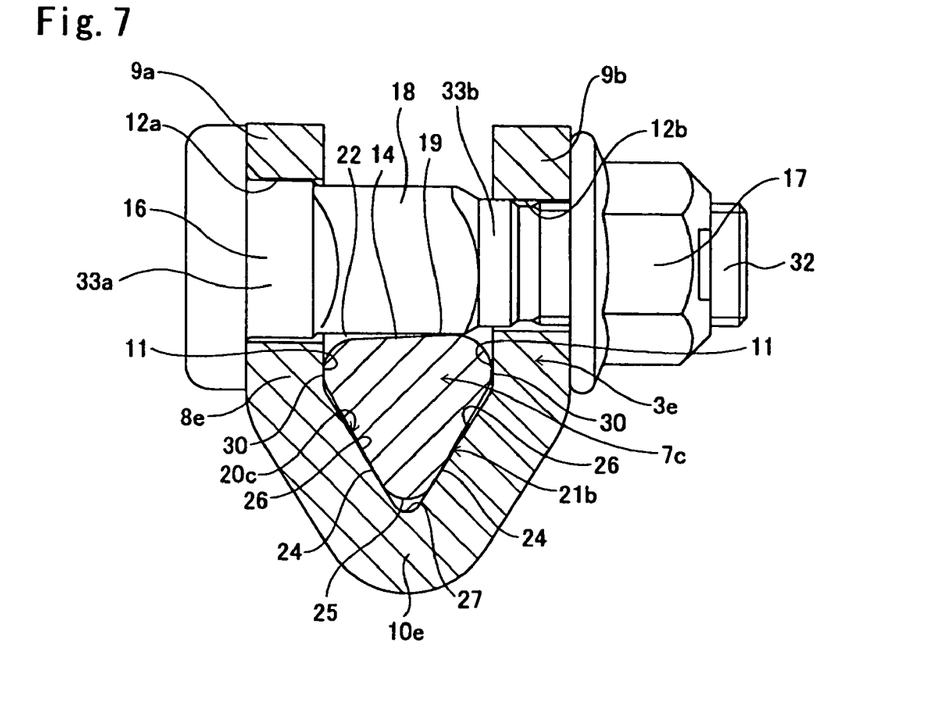
FIG. 7 is a drawing similar to FIG. 4 showing the third embodiment.

Next, FIG. 6 and FIG. 7 show a third embodiment of the present invention. In the case of this embodiment, of the shaft 7c, at least the cross-sectional shape of the tip end section that is inserted inside the base end section 8e of the yoke 3e is roughly an equilateral triangular shape. Together with this, the pair of supported surfaces 30 formed on both side surfaces on the tip end section of the shaft 7c are convex surfaces having arc-shaped cross sections. Also, by using this kind of construction, a large portion of the tip end section of the shaft 7c is such that it fits inside the V-shaped connecting section 10e of the base end section 8e. The construction and function of the other parts are the same as in the case of the embodiments described above.

Embodiment 4

Figure 8:
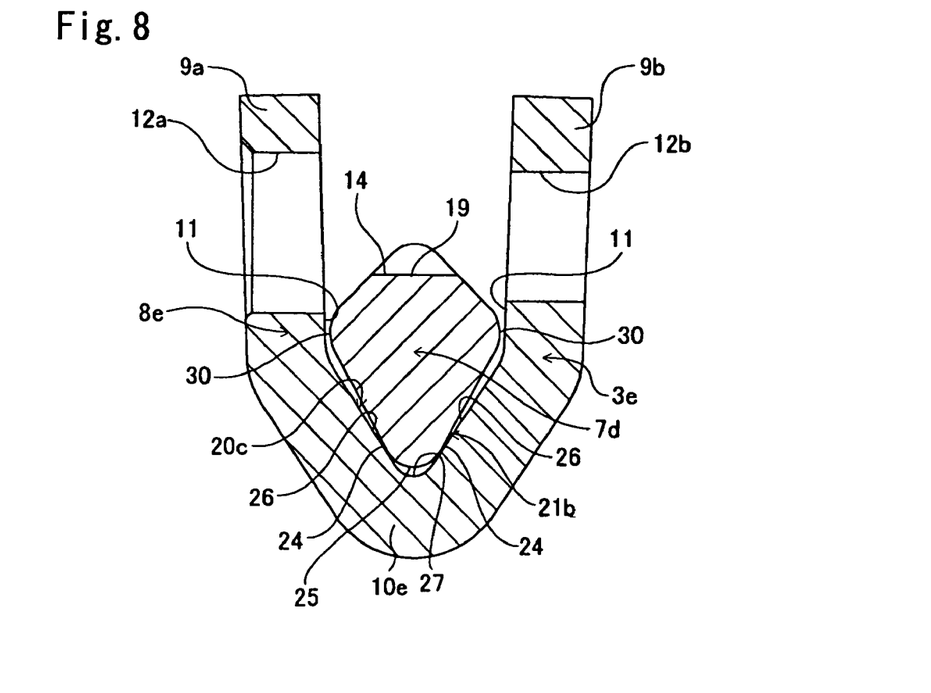
FIG. 8 is a drawing similar to FIG. 1, and it shows a fourth embodiment of the invention.

Next, FIG. 8 shows a fourth embodiment of the present invention. In the case of this embodiment, of the shaft 7d, at least the cross-sectional shape of the tip end section that is inserted inside the base end section 8e of the yoke 3e is roughly diamond shaped. The construction and function of the other parts are the same as those in the embodiments described above.

Embodiment 5

Figure 9:
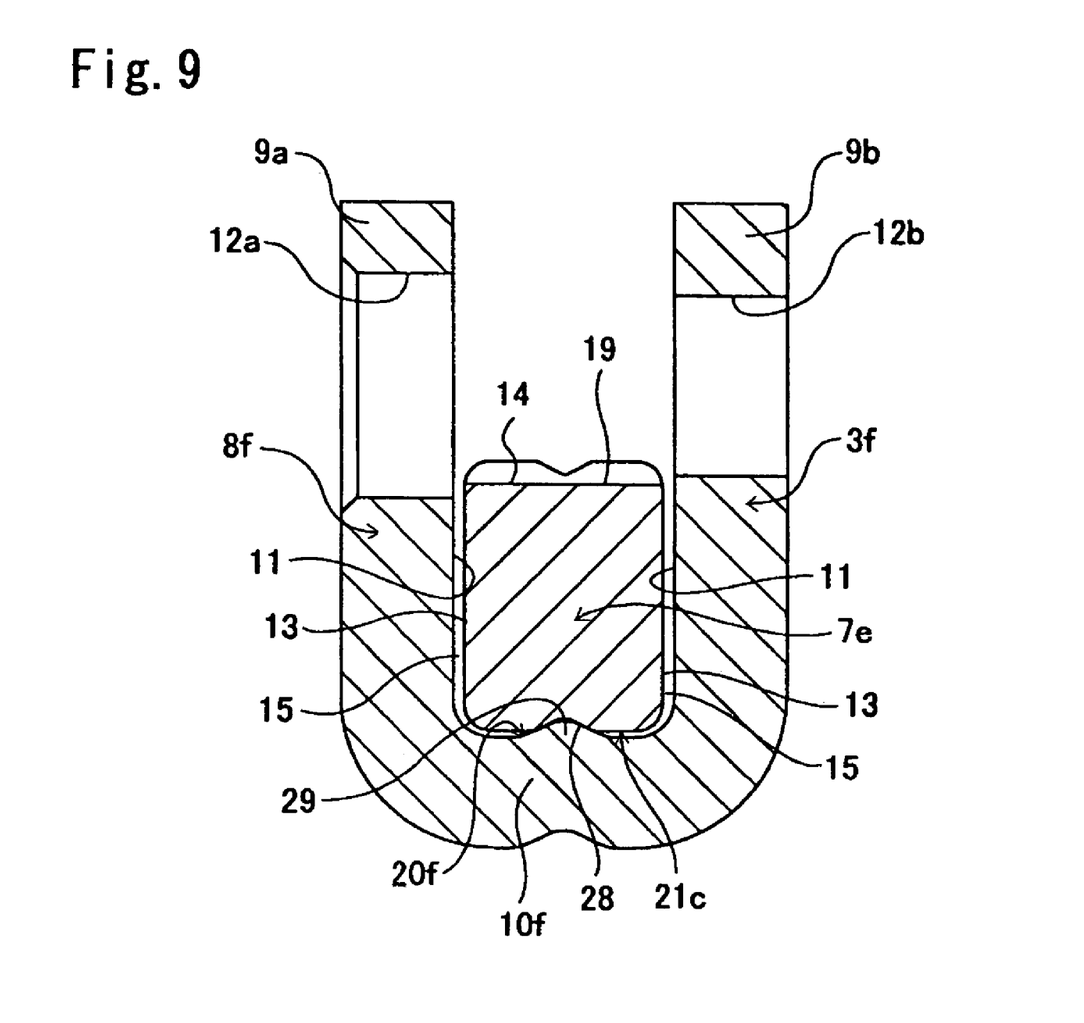
FIG. 9 is a drawing similar to FIG. 1, and it shows a fifth embodiment of the invention.

Next, FIG. 9 shows a fifth embodiment of the present invention. In the case of this embodiment, of the shaft 7e, a concave section 28 that extends in the axial direction (front-to-back direction in FIG. 9) is formed in at least the middle in the width direction (left-right direction in FIG. 9) of the opposing surface 21c of the tip end section that is inserted inside the base end section 8f of the yoke 3f. Also, a convex section 29 that extends in the axial direction (front-back direction in FIG. 9) is formed in the middle section in the width direction (left-right direction in FIG. 9) of the inside surface 20f of the connecting section 10f of the base end section 8f. This convex section 29 fits together with the concave section 28. As in the embodiments described above, in the case of this embodiment constructed as described above, it is possible to prevent vibration from occurring in the completed joint section based on the fit between the opposing surface 21c and the inside surface 20f. In the case of this embodiment, the contour line (cross-sectional shape) of the concave section and convex section can be a simple arc-shaped curve, or can be a compound curve. The construction and function of the other parts are the same as in the first embodiment described above and shown in FIGS. 1 to 4.

Embodiment 6

Figure 10:
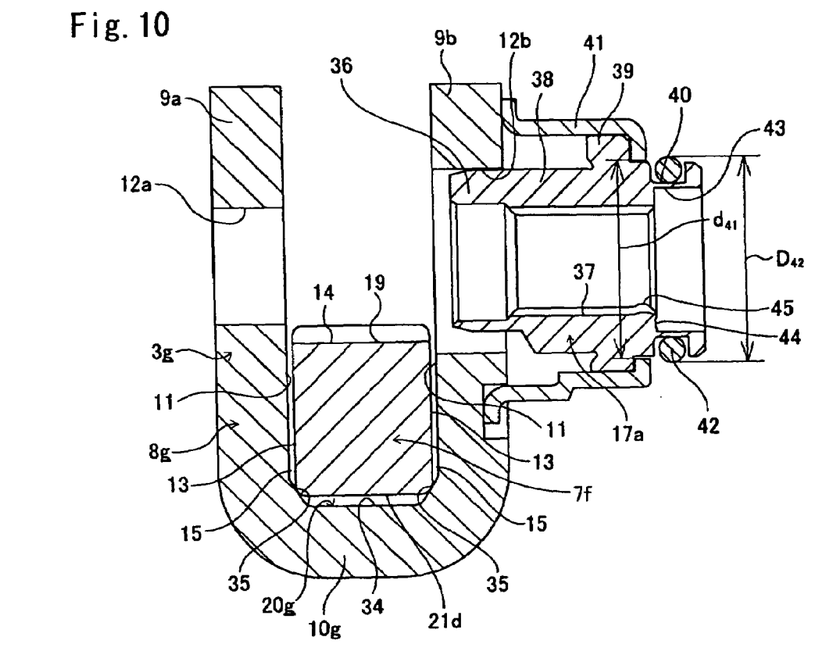
FIG. 10 is a drawing similar to FIG. 1, and it shows a sixth embodiment and shows the state in which a nut is held in the yoke.
Figure 11:
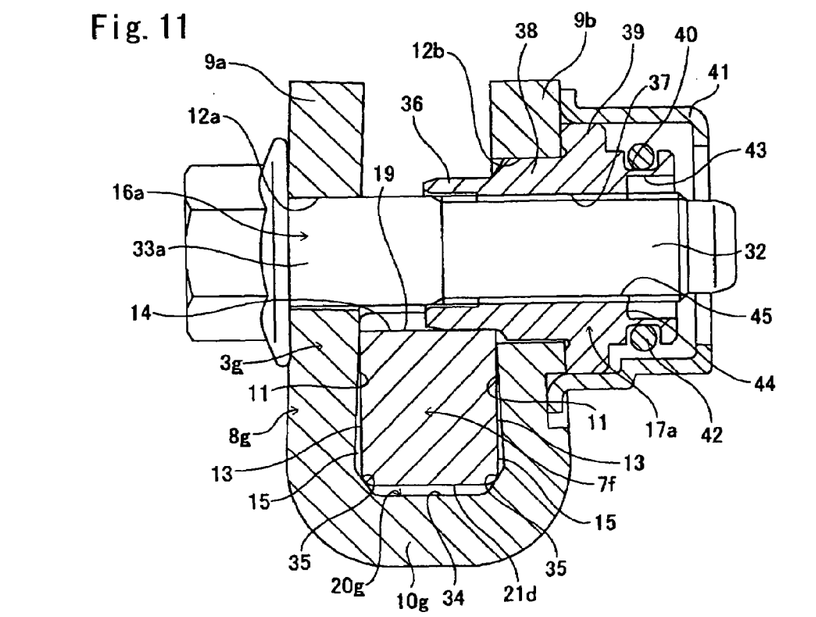
FIG. 11 is a drawing similar to FIG. 3 showing the sixth embodiment.

Next, FIGS. 10 and 11 show a sixth embodiment of the present invention. In the case of this embodiment, by making the cross-sectional shape of the tip end section of the shaft 7f into roughly a rectangular shape, the opposing surface 21d formed on part of the surface around the tip end section is made to be a flat surface parallel with the bottom surface 19 of the notch 14 formed on the opposite side in the radial direction. Also, the inside surface 20g of the connecting section 10g of the base end section 8g of the yoke 3g is a combined surface having a flat-surface section 34 in the middle in the width direction (left-right direction of FIGS. 10 and 11) and inclined-surface sections 35 on both of the end sections in the width direction. Of these, the inclined-surface sections 35 are flat surfaces that are inclined in a direction toward the opening side of the base end section 8g (upward in FIGS. 10 and 11), going toward the sides in the width direction of the inside surface 20g. In the case of this embodiment, when the tip end section of the shaft 7f is inserted inside the base end section 8g, the edges on both ends in the width direction (left-right direction in FIGS. 10 and 11) of the opposing surface 21d come in contact (engage) with the inclined-surface sections 35.

Also, in this embodiment, a bolt not having a cam section in the rod section (a normal bolt whose rod section is completely cylindrical shaped) is used as the support bolt 16a that is inserted through the pair of through holes 12a, 12b that are formed in the base end section 8g. Also, in this embodiment, a cam section 36 for pressing the bottom surface 19 of the notch 14 is formed on part of the nut 17a that is screwed onto the male screw section 32 of the support bolt 16a. In other words, the nut 17a has a cam section 36 formed on the tip end in the axial direction (left end in FIGS. 10 and 11) and its outer surface functions as a cam surface. Also, similarly, an insert section 38 having a cylindrical surface that is concentric with the screw hole 37 formed in the center portion of the nut 17a is formed around the nut 17a in the middle section near the tip end, and it can be freely inserted inside the through hole 12b without a large amount of play. Also, of the outer surface around the nut 17a, an outward-facing and flange-shaped rim section 39 is formed all the way around the base end of the middle section in the axial direction (right end in FIGS. 10 and 11), and similarly, a fastening-groove section 40 is formed all the way around the base end section. Moreover, a large-diameter-hole section 43 whose diameter is greater than the inner diameter of the screw hole 37 is formed around the inner surface on the base end of the nut 17a. Furthermore, a crimped section 45 is formed around the edge on the base end of the screw hole 37 by pressing the stepped section 44 located in the connecting section between the screw hole 37 and large-diameter hole 43 with a punch or the like, and plastically deforming this pressed section and the area around it inward in the radial direction.

As shown in FIG. 10, before the support bolt 16a is screwed into this kind of nut 17a, this nut 17a is held inside a metal cover 41 that is formed into a complete ring shape having a crank-shaped cross section, and supported by the support-plate section 9b of the base end section 8g. In other words, as shown in FIG. 10, in the state that the nut 17a is internally fitted inside the cover 41, the base end section protrudes out through the opening on one end (right end in FIGS. 10 and 11) of the cover 41. Also, by fastening an O-ring 42 made of an elastic material in the fastening groove 40 formed around the outer surface of this protruding section, the protruding section is prevented from accidentally entering inside the cover 41 (the cover 41 and nut 17a are prevented from accidentally becoming separated before joining the cover 41 to the support-plate section 9b). In order for that, the outer diameter $D_{42}$ of the O-ring 42 fastened to the fastening groove 40 is a little larger than the inner diameter $d_{41}$ of the opening section on one end of the cover 41 ($D_{42} > d_{41}$). Also, with the other end (left end in FIGS. 10 and 11) of the cover 41 fastened to the support-plate section 9b, the tip end section of the nut 17a is inserted inside the through hole 12b formed in the support-plate section 9b.

When completing the joint section of this embodiment, as shown in FIG. 10, by inserting the support bolt 16a through the through holes 12a, 12b and further rotating this support bolt 16a, the male screw section 32 on this support bolt 16a is screwed into the screw hole 37 of the nut 17a. By doing this, the nut 17a is pulled toward the head side (left side in FIG. 11) of the bolt 16a, and together with the rim section 39 coming in contact with the outside surface of the support-plate section 9b, the insert section 38 is inserted into the through hole 12b, and the cam section 36 faces the bottom surface 19 of the notch 14. At this time, while elastically compressing the diameter of the O-ring 42, the base end section of the nut 17a is drawn inside the cover 41 together with the O-ring 42. Furthermore, in this state, by rotating the nut 17a by the large friction force acting between the male screw section 32 and crimped section 45 due to the tightening of the male screw section 32 into the screw hole 37, the outer surface around the cam section 36 is pressed against the bottom surface 19 of the notch 14. Also, due to this pressing force, the edges on both end section in the width direction of the opposing surface 21d are strongly pressed against both the inclined-surface sections 35 of the inside surface 20g. In this embodiment, of the rod section of the support bolt 16a, the area of contact between the outer surface around the cylindrical (not constituting a male screw) section 33a, which has a cylindrical-shaped outer surface and which is formed nearer the base end section than the male screw section 37, and the inner surface of the through hole 12a, and the area of contact between the outer surface around the insert section 38 of the nut 17a and the inner surface around the through hole 12b, support the reaction force of the pressing.

Similar to the embodiments described above, in the case of this embodiment constructed as described above, due to the fit between the opposing surface 21d and the inside surface 20g, it is possible to prevent vibration from occurring in the completed joint unit. The construction and function of the other parts are the same as those of the first embodiment described above and shown in FIGS. 1 to 4.

It was not shown in the figures, however, when embodying this invention, it is possible to construct the opposing surface on the tip end section of the shaft and the inside surface of the connecting section of the base end section of the yoke such that they are both partially serrated uneven surfaces, and such that the serrated surfaces fit together. Similar to the other embodiments described above, by using this kind of construction as well, the fit between both of the partially serrated uneven surface makes it possible to prevent vibration from occurring in the completed joint section.

When embodying this invention, it is possible to make the yoke by pressing, hot forging, cold forging, etc. Also, the material used for the yoke in the case of pressing can be JIS hot-rolled mild steel plate, JIS rolled steel plate for automobile manufacturing, or material equivalent to these, and the plate thickness (nominal thickness) should be about 6 to 6.5 mm. Similarly, in the case of hot forging or cold forging, the material used can be JIS carbon steel for machine structure use, JIS alloy steel for machine structure use, or a material equivalent to these. Also, the screw size of the bolt and cam bolt used can be JIS M8, JIS M10 or an equivalent size.

It is preferred that the joint section between the shaft and universal-joint yoke of this invention be applied to a column type electric power-steering apparatus (particularly in a rack-and-pinion steering apparatus having a rack thrust of 9,000 N) in which it is easy for large torque to occur during driving. However, the invention can also be applied to other types of electric power-steering apparatuses, hydraulic power-steering apparatuses, manual-steering apparatuses, etc. Moreover, the invention can be used in combination with a shock absorber such as a rubber coupling, or- slider mechanism such as a spline joint. Also, the fastening means of the joint section of this invention is not limited to a combination of a support bolt, such as the cam bolt shown in each of the embodiments described above, and a nut having an increased rotation resistance in the thread section so that it is easy for the cam bolt to turn with it; for example, as disclosed in Patent Documents 2, 4 and 5, it is also possible to use a well-known conventional fastening means.

What is claimed is:

1. A joint section between a shaft and universal-joint yoke comprising:
    a shaft that rotates when in operation;
    a pair of supported surfaces that are formed on opposite side surfaces on a tip end of the shaft;
    a yoke constituting a universal joint that has a base end section with an opening on one side;
    a pair of support-plate sections of the base end section that are located on opposite sides of a center axis of the yoke so that they are separated from one another, inside surfaces of the support-plate sections functioning as support surfaces and facing the supported surfaces;
    a connecting section of the base end section that connects the support-plate sections at a location opposite to the opening;
    holes that are concentric with one another and are formed in the support-plate sections, respectively, adjacent to the opening; and
    a support bolt that extends between the support-plate sections in the holes and is adapted to be connected to threads at a tip end of the support bolt to draw the support-plate sections toward one another; and wherein the joint section is constructed so that before the support bolt is connected to the threads, a clearance is formed between the support surfaces and the supported surfaces, and after the support bolt is connected to the threads, a tip surface on the tip end of the shaft located between the supported surfaces faces an inside surface of the connecting section and comes into contact with the inside surface of the connecting section of the yoke at two contact locations, and a clearance between the tip surface and the inside surface is formed between the two contact locations, whereby the tip surface on the tip end of the shaft is made to fit with the inside surface of the connecting section such that it is not possible for the tip end of the shaft to move in opposite directions with respect to the support-plate sections, and such that a center axis of the shaft does not move in a direction orthogonal to this center axis, and the tip end of the shaft does not rotate around the center axis.

2. The joint section between a shaft and universal-joint yoke according to claim 1, wherein the tip surface on the tip end of the shaft and the inside surface of the connecting section fit together in concave-convex engagement.

3. The joint section between a shaft and universal-joint yoke according to claim 2, wherein the tip surface is a convex surface whose contour line projected on a virtual plane that is orthogonal to its own axial direction is not an arc whose center is the center axis of the shaft or a point that is separated further from the tip surface than the center axis, and the inside surface is a concave surface whose contour line projected on a virtual plane that is orthogonal to its own axial direction is not an arc whose center is the center axis of the yoke or a point that is separated further from the inside surface than the center axis thereof.

4. The joint section between a shaft and universal-joint yoke according to claim 2, wherein the tip surface is a convex surface whose contour line projected on a virtual plane that is orthogonal to its own axial direction is not a single arc, and the inside surface is a concave surface whose contour line projected on a virtual plane that is orthogonal to its own axial direction is not a single arc.

5. The joint section between a shaft and universal-joint yoke according to claim 2, wherein the tip surface is a convex surface whose contour line projected on a virtual plane that is orthogonal to its own axial direction is located on the outside in the radial direction from a virtual arc that has a center that is the center axis of the shaft and passes through ends of the contour line, and the inside surface is a concave surface whose contour line projected on a virtual plane that is orthogonal to its own axial direction is located on the outside in the radial direction from a virtual arc that has a center that is the center axis of the yoke and passes through the ends of the contour line.

6. The joint section between a shaft and universal-joint yoke according to claim 2, wherein the tip surface is a concave surface and the inside surface is a convex surface.

7. The joint section between a shaft and universal-joint yoke according to claim 1, wherein the supported surfaces come into contact with the support surfaces.

8. The joint section between a shaft and universal-joint yoke according to claim 1, wherein a cam bolt is used as the support bolt.

9. The joint section between a shaft and universal-joint yoke according to claim 1, wherein a nut having a cam section provides the threads to which the tip end of the support bolt is connected.

* * * * *